United States Patent [19]

Matsumura

[11] 4,445,764
[45] May 1, 1984

[54] LIGHT MEASURING DEVICE FOR A SINGLE LENS REFLEX CAMERA

[75] Inventor: Susumu Matsumura, Kanagawa, Japan

[73] Assignee: Canon Kabushiki Kaisha, Tokyo, Japan

[21] Appl. No.: 326,284

[22] Filed: Dec. 1, 1981

[30] Foreign Application Priority Data

Dec. 2, 1980 [JP] Japan .................................. 55-170622
Dec. 2, 1980 [JP] Japan .................................. 55-170627

[51] Int. Cl.³ .............................................. G03B 7/00
[52] U.S. Cl. ...................................... 354/480; 354/481
[58] Field of Search ....................... 354/42, 49, 56, 59, 354/227, 38; 356/225, 233–235; 350/437, 330, 331 R, 335, 229, 237 R

[56] References Cited

U.S. PATENT DOCUMENTS

| | | | |
|---|---|---|---|
| 3,205,796 | 9/1965 | Lieser | 354/59 |
| 3,536,408 | 10/1970 | Norwood | 354/59 X |
| 3,955,208 | 5/1976 | Wick et al. | 354/227 |
| 4,040,751 | 8/1977 | Baker et al. | 356/225 |
| 4,075,640 | 2/1978 | Ueda et al. | 354/59 X |
| 4,079,390 | 3/1978 | Iwata et al. | 354/42 X |
| 4,105,300 | 8/1978 | Plummer | 250/237 R X |
| 4,142,787 | 3/1979 | Ueda et al. | 354/38 |

Primary Examiner—William B. Perkey
Attorney, Agent, or Firm—Toren, McGeady and Stanger

[57] ABSTRACT

A light measuring device for measuring the light in the field by means of a light sensing means sensing the light reflected of the shutter plane provided in the neighborhood of the image forming plane of the photographing lens or the film plane or both of them. In the optical path of the reflected light a change over means for changing over the light sensitivity distribution of the metering so as to enable the change over of the light.

4 Claims, 13 Drawing Figures

LIGHT MEASURING DEVICE FOR A SINGLE LENS REFLEX CAMERA

BACKGROUND OF THE INVENTION

1. Field of the Invention

The present invention relates to a light measuring device for the single lens reflex camera for carrying out the so called direct light measurement in accordance to which the light reflected on the film plane or the shutter plane or both of them so as to measure the light amount in the field.

2. Description of the Prior Art

Generally, the systems with a single light sensing element in accordance to which the light measuring optical system between the light measuring object image forming plane (for example, the film plane or the focusing plane) and the light sensing element is changed so as to change over the light sensitivity distribution between the selective area light measurement and the average light measurement is already known.

In such systems as mentioned above there are two kinds, namely the one, in accordance to which two kinds of the light measuring optical systems arranged in front of the light sensing element are changed over so as to select the selective area or the average light measurement as is disclosed in Japanese Patent Laid-Open No. Sho 53-98821 and the other one in accordance to which a zoom lens is arranged in front of the light sensing element so as to vary the light sensitivity distribution on the focusing plane so as to select the selected area or the average light measurement as is disclosed in Japanese Patent Publication No. Sho 51-20899.

However, both of the above systems have a problem, because two kinds of the optical systems have to be made use of or the zoom optical system has to be made use of, which makes the production cost high or the size of the optical system large.

Especially in case of the direct light measurement, the light sensing means is generally arranged on the bottom of the dark space of the camera so that the size of the change over means of the light measurement range is a problem.

SUMMARY OF THE INVENTION

An object of the present invention is to suffer a compact and economical light measuring device for the single reflex camera by means of which the light sensitivity distribution can be changed over.

DESCRIPTION OF THE PREFERRED EMBODIMENTS

Below the present invention will be explained in accordance with the accompanying drawings of the embodiments thereof.

Figure 1:
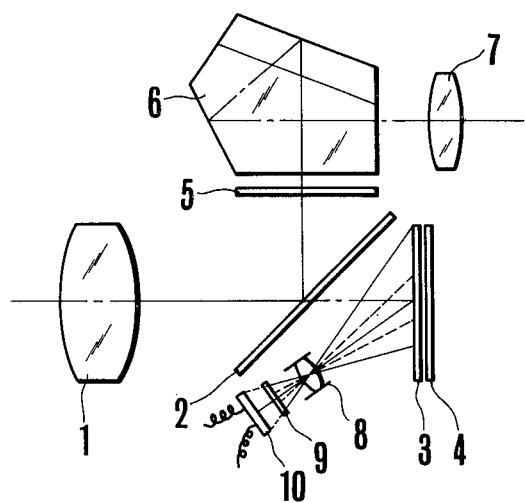
FIG. 1 shows the internal construction of the camera in accordance with the present invention.

FIG. 1 shows the whole construction of the light sensitivity distribution change over device. In the drawing, 1 is the photographing lens, 2 is the quick return mirror, 3 is the shutter plane, 4 is the film, 5 is the focusing plate, 6 is the pentagonal prism and 7 is the eye piece lens. 8 is the image forming lens for forming the image with the light reflected from the shutter plane or film plane, 9 is the filter arranged at the image forming position of the lens 8 or in the neighborhood of the position, and 10 is the light sensing element as the light detecting device arranged behind the filter.

Consequently, at the time of photographing, the light having passed the photographing lens is reflected from the shutter plane 3 or the film 5 or both of them, and measured with the light detecting device 10 through the image forming lens 8 and the filter 9. At this time, the image forming lens 8 forms the image of the shutter plane or the film plane on or near the filter 9, while the light detecting device 10 measures the light of the image formed on or near the filter 9.

The filter 9 is so designed that in accordance with the light sensitivity distribution such as selected area light measurement or the average light measurement, the filter elements with different light transmittance distribution is arranged, whereby the filter elements are changed over so as to change over the light sensitivity distribution or that the distribution of the light transmittance of the filter is changed over so as to change over the light sensitivity distribution.

Figure 2:
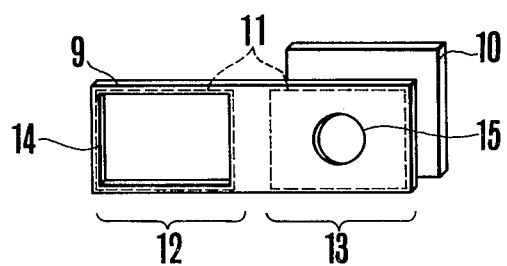
FIG. 2 shows a first concrete embodiment of the filter shown in FIG. 1.

Below the concrete embodiment of the filter 9 will be explained. FIG. 2 shows a first embodiment of the filter, whereby the filter elements are changed over so as to change over the light sensitivity distribution. 10 is the light detecting device, in front of which the filter is arranged. The square 11 in a dotted line shows the size of the picture frame, in which the image is formed with the image forming lens 8. 12 is the filter element for the average light measurement, while 13 is that for the selected area light measurement. In the drawing, each filter element is a metal plate having openings 14 and 15, whereby only the openings allow the light to pass in such a manner that the light only in the light measuring area is led to the light measurement device 10. By changing over the filter elements in front of the light detecting device mechanically, the average and the selected area light measurements can be changed over.

In order to receive all the light passing through the filter element 12 or 13 with the light detecting device 10, the device 10 in the construction in FIG. 2 has to be larger the size of the picture frame in which the image is formed. However, in practice, if the distance between the filter 9 and the light detecting device is not chosen so large, it is sufficient that the light detecting device is almost as large as the size of the picture frame. At this time, some light coming from the circumference of the picture goes outside of the light detecting device 10, the loss of the light is not so much large. Further, from the view point of practice, the light measuring sensitivity for the circumference of the picture frame is low, for instance, for the average light measurement with priority on the center portion or the selected area light measurement, so that there is no problem.

Figure 3:
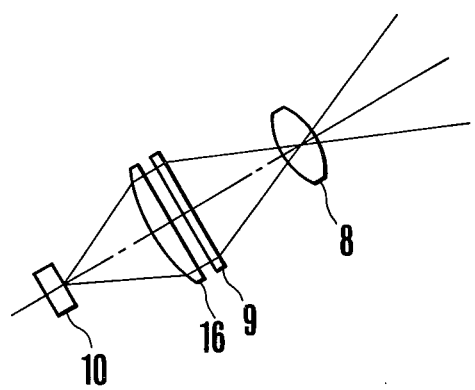
FIG. 3 shows the condenser lens arranged behind the filter shown in FIG. 1 so as to make the light detecting device small.

Further, in case the light detecting device 10 with small area is used, it is sufficient, as is shown in FIG. 3, to provide a condenser lens 16 with short focal length immediately behind the filter and the light detecting device 10 near the focusing plane of the lens 16. At this time, it is possible to construct the filter 9 and the condenser lens 16 as one body so as to be able to change over the filter.

The above-mentioned filter relates to that for the average light measurement and the selected area light measurement. Hereby, the brightness on the plane of the light detecting device for the object with even brightness is different for the average light measurement and the selected area light measurement. Hereby, it is desirable that for an object with even brightness the output of the light detecting device to be equal for both of the average and the selected area light measurement, because the electrical circuit for the light measurement can be simple.

Figure 4:
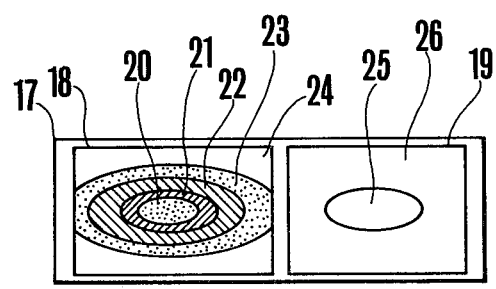
FIG. 4 shows a second concrete embodiment of the filter shown in FIG. 1.

FIG. 4 shows the second embodiment of the filter for the above purpose. In FIG. 4, 17 is the filter frame and 18 and 19 are the filter elements, whereby the filter elements consist of a film in which the light transmittance is distributed. Now, let us suppose that the transmittance for the portion 20 is $T_{20}$, that for 21 is $T_{21}$, that for 25 is $T_{25}$ and that for 26 is $T_{26}$. Further let us suppose that the area for the portion 20 is $S_{20}$, that for 21 is $S_{21}$, and that for 26 is $S_{26}$. Hereby the transmittance and the areas are chosen so as to satisfy the following relation:

$$\sum_{i=20}^{24} T_i S_i = \sum_{j=25}^{26} T_j S_j \quad (1)$$

In this way, the filter element 18 is for the average light measurement with priority on the center portion, while that 19 is for the selected area light measurement. Further, as is clear from the relation (1), for the object with even brightness the amount of the light incident on the light detecting device 10 is equal for both kinds of light measurements and therefore the output of the light detecting device 10 is equal.

In order to obtain such filters, the amount of the exposure for the areas 20-24 of the film is varied and after the termination of the exposure the film is developed. After the master film is obtained in this way, the film is placed on the raw film, which is exposed to the even light and developed.

Otherwise, instead of the film, masks are prepared on the glass base plate for the areas 20-24, which are metallized so as to obtain different thickness of the metal coatings in order to obtain different light transmittance. The filter element 18 can be substituted for the above.

Figure 5:
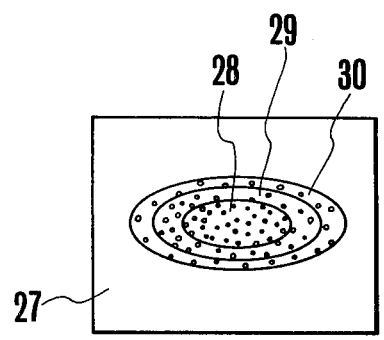
FIG. 5 shows another construction of the one filter element shown in FIG. 4.

FIG. 5 shows further another embodiment. In FIG. 5, 27 is the filter element for the average light measurement with priority on the center portion having a similar distribution of the light transmittance to that of the element 24 shown in FIG. 4. However, in case of the present embodiment the distribution of the light transmittance is realized with the pin holes distributed in the filter element 27. Namely, the density of the pin holes is highest in the portion 28 and lower towards the outside, namely in the portions 29 and 30. The diameter of a pin hole is sufficiently small as compared with the short side of the filter element 27 in such a manner that the light distributed on the filter is sampled and led to the light detecting device 10. The light transmittance of the portions 28-30 of such a filter is given with T=(Area of a pin hole)×(Density of pin holes). Consequently, by changing the diameter of a pin hole or the density of pin holes (number of pin holes/area) for the areas 28-30, the distribution of the light transmittance can be controlled.

In order to avoid the Moire phenomenon with the object it is desirable that the pin holes are distributed at random. However, even if the pin holes are distributed regularly, the contrast of the Moire patterns can be suppressed in case the MTF characteristics (image resolving characteristics) of the optics (for example, lens system 8 or mirror 2 in FIG. 1) for forming the object image on the filter is controlled in such a manner that the MTF value for the spatial frequency corresponding to the period of the regular distribution of the pin holes is sufficiently low.

In case of the so far explained filter, the filter elements whose light transmittance is fixed are mechanically changed over in such a manner that at a certain determined position in front of the light detecting device, the filter element for the selected area or the average light measurement is positioned in order to change over the sensitivity distribution of the light measuring.

In case the filter elements are constituted of an electrooptical element such as electrochromy EC or liquid crystal LC, whose light transmittance distribution can be controlled, without changing over the filter itself mechanically the distribution of the light transmittance can be changed over electrically, which is profitable for efficiency and space.

However, such a electrooptical element does not change in the light transmittance continuously but has a binary characteristics that the light transmittance changes abruptly when the applied voltage exceeds a certain threshold value. Further, if this binary characteristics is made up of, more stabilized efficiency can be obtained. In consequence, the filter shown in FIG. 5 is more convenient than that shown in FIG. 4. Namely, it is sufficient to prepare the transparent electrode for applying voltage to the electrooptical element so as to correspond to the pattern of pin holes as is shown in FIG. 5. An embodiment of such filter is shown in FIG. 6.

Figure 6:
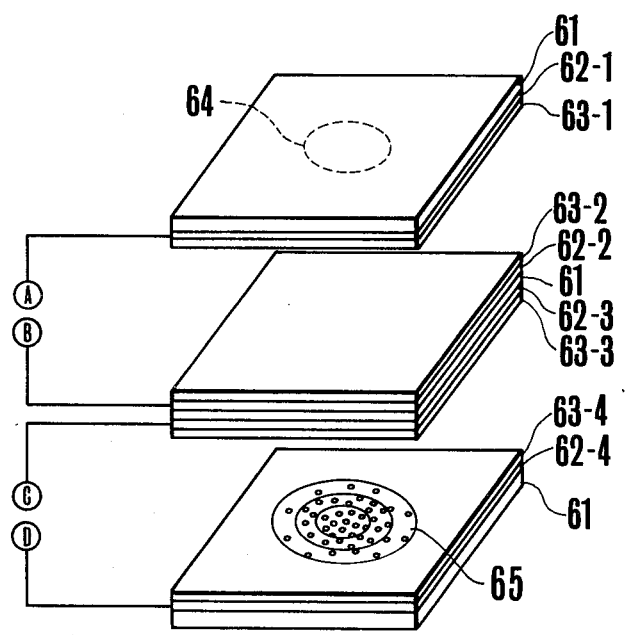
FIG. 6 shows a third embodiment of the filter shown in FIG. 1.

FIG. 6 shows only the construction of the electrode of the filter consisting of electrochromic material. In the drawing, 61 is the glass base plate, 62 is the transparent electrode and 63 is the ion permeable insulation film. The uppermost and the lowest transparent electrodes have each pattern 64 and 65, whereby there is no transparent electrode within the circuit 64 or with the pin hole area 65. The distribution of the pin holes is same as is shown in FIG. 5.

The electrochromic material is filled between these electrodes. When a sufficient voltage is applied between A and B, only the part corresponding to the inside of the circle 64 becomes transparent, while the light transmittance of other parts lowers. Further, when a sufficient voltage is applied between C and D, only the part corresponding to the pin hole area 65 becomes transparent, while the light transmittance of other part lowers. Consequently, when a proper voltage is applied between C and D so as to discolor the lower electrochromic material, while a voltage is applied between A and B in such a manner that only the upper electrochromic material is colored, the distribution of the light transmittance suited for the selected area light measurement can be obtained. On the other hand, when after the upper electrochromic material is discolored, the lower electrochromic material is colored, a distribution of the light transmittance suitable for the average light measurement with priority on the center portion such as shown in FIG. 5 can be obtained.

Consequently, by applying such an electrochromic element as the filter 9 shown in FIG. 1, the average and the selected area light measuring can be changed over electrically.

Although the so far explained light measuring optical system is the image forming optics consisting of a lens as is shown in FIG. 1, it is evident that the sensitivity distribution of light measuring can be changed over in the same way even with the image forming optics of a concave mirror.

Further, the sensitivity distribution of the light measuring can be changed over even if the reflecting filter having a different distribution of the reflectance is used instead of the conventional light transmissive filter in such a manner that the light reflected from this filter is detected with the light detecting device. As explained so far in accordance with the present invention, the sensitivity distribution of the light measuring can easily changed over by changing over the filter elements prepared for the respective sensitivity distribution, which is profitable for cost and space. Further, when the filter is constituted of the electrochromic material or the liquid crystal the sensitivity distribution of the light measuring can be changed over electrically, which is profitable for cost and space.

Figure 7:
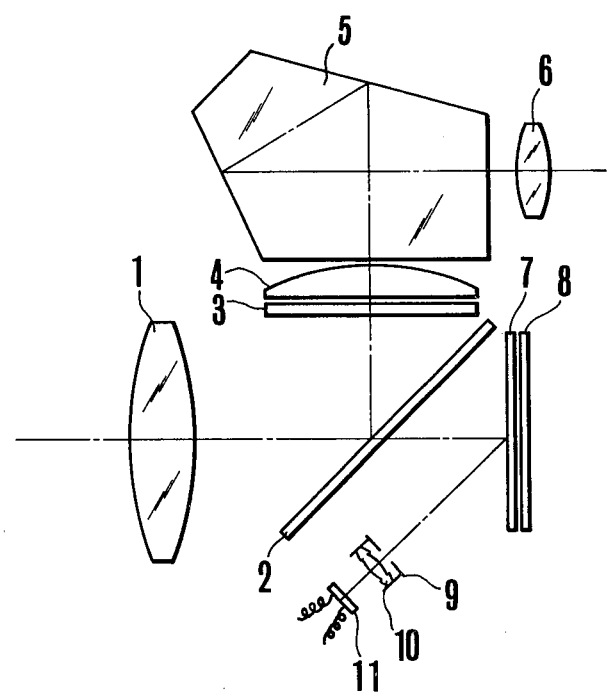
FIG. 7 shows another embodiment of the optics of the single lens reflex camera having the light measuring optical system in accordance with the present invention.

FIG. 7 shows a second embodiment of the optical system for the single lens reflex camera having the light measuring optical system in accordance with the present invention.

In the drawing, 1 is the photographing lens, 2 is the quick return mirror having the semi-transparent property, 3 is the focusing plate, 4 is the condenser lens, 5 is the pentagonal prism, 6 is the eye piece lens, 7 is the shutter plane, 8 is the film, 9 is the diaphragm, 10 if the bifocal lens and 11 is the photoelectric element. The drawing shows the direct light measuring optical system for measuring the light reflected from the leading shutter curtain of the focal plane shutter.

Figure 8:
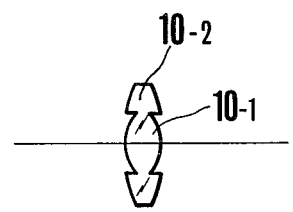
FIG. 8 shows in section the bifocal lens for the camera shown in FIG. 7.

FIG. 8 shows the lens 10 in section. The lens 10 is a bifocal lens, whereby the focal length $f_1$ of the internal part 10-1 is different from that $f_2$ of the external part 10-2. Consequently, the internal lens 10-1 forms a different image from that formed with the external lens 10-2 in such a manner that the light measuring area when the diaphragm 9 is opened so as to make use of the external lens in order to measure light is different from that when the diaphragm 9 is closed so as to make use of the internal lens, in which way the sensitivity distribution of the light measuring can be changed over.

Figure 9:
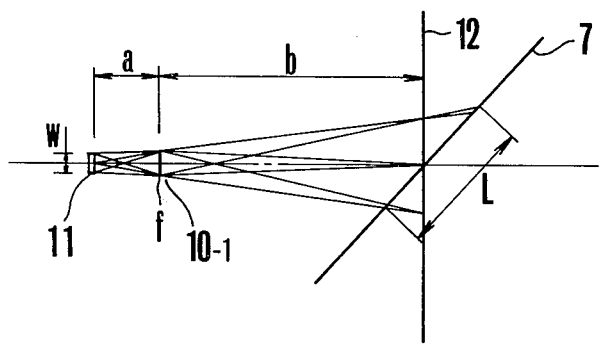
FIG. 9 shows the image formation by the internal part of the lens shown in FIG. 8.

FIG. 9 shows the image forming by means of the internal lens of the lens 10 shown in FIG. 8. In the drawing, 12 is the image plane of 11 with the lens 10-1.

Now, let us suppose that the focal length of the lens 10-1 is $f_1$, the distance between the light detecting device 11 and the principal point of the lens 10-1 is a, and that between the principal point of the lens 10-1 and the image plane 12 is b. As an example, let $f_1=3.06$ mm, $a=3.82$ mm, so $b=15.3$ mm. Now let the width W of the light detecting device be 1.4 mm, so an image 5.6 times as large is formed on the image plane, whereby L is about 8 mm. Consequently, the internal lens condenses the reflected light of the image on the leading shutter plane 7 within the area with 8 mm diameter and leads it to the light detecting device 11.

Figure 10:
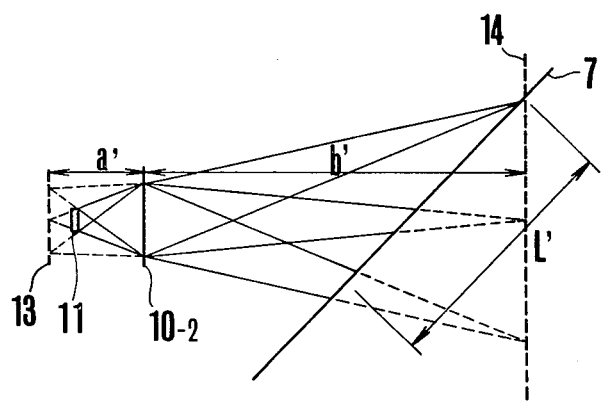
FIG. 10 shows the image formation by the external part of the lens shown in FIG. 8.

FIG. 10 shows the image forming with the external lens of the lens 10 shown in FIG. 8. In the drawing, 13 is the imaginary object plane and 14 is the imaginary image plane. As an example, let $f_2=4.45$ mm, $a'=5.56$ mm, so $b'=22.25$ mm, whereby L' is about 14.6 mm. Comparing L' in FIG. 10 with L in FIG. 9, it is understood that the light measuring area is enlarged twice as large.

In consequence, when the diaphragm in FIG. 7 is closed so as to measure the light only by means of the internal lens 10-1 the selected area light measurement is carried out, while when the diaphragm is opened so as to measure the light by means of not only the internal but also the external lens the light measurement is carried out for wider area, namely the average light measurement is carried out.

As explained so far in accordance with the present invention by applying such a special bifocal lens as is shown in FIG. 8 for the light measuring optical system the sensitivity distribution of the light measuring can be changed over only by opening and closing the diaphragm.

Figure 11:
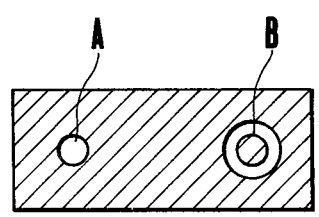
FIG. 11 shows another embodiment of the diaphragm to be used with the lens shown in FIG. 8.

Further, by preparing two kinds of diaphragms, namely with the shapes A and B as are shown in FIG. 11, the sensitivity distribution of the light measuring can be changed over by making use of only the internal lens or the external lens, whereby the diaphragms A and B are changed over. In this case, it is important to choose the diameters of the respective lenses and the diaphragms in such a manner that the amount of the light incident upon the light detecting device through the internal lens and that through the external lens are equal to each other in order to obtain a light measuring system which the level of the amount of the light remains unchanged even when the sensitivity distribution of the light measuring is changed over.

Further, although not shown in FIG. 7, it is possible to eliminate the variation of the amount of the light with the change over of the sensitivity distribution of the light measuring by engaging a light absorbing means (for example, an ND filter) operatively with the change over. It is desirable that such kind of light absorbing means is construct as one body with the diaphragm or the bifocal lens.

Further, it is possible to eliminate the variation of the amount of the light by means of an electrical circuit by changing over the gain of the light measuring circuit in operative engagement with the change over.

Figure 12:
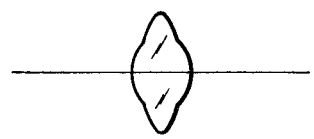
FIGS. 12 and 13 show in section other embodiments of the bifocal lens to be used for the light measuring optical system in accordance with the present invention.
Figure 13:
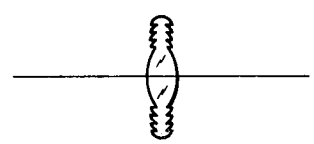

FIGS. 12 and 13 show in section further other embodiments of the bifocal lens to be applied for the light measuring optical system in accordance with the present invention.

In case of the embodiment in FIG. 12, the connecting part of the internal lens with the external lens is continuous. In case of the embodiment in FIG. 13, the external lens consists of Fresnel lens so as to realize a thin lens as a whole. Further, it is possible to constitute the internal lens in FIG. 7 of a Fresnel lens, although not shown in the drawing.

Although, FIG. 7 shows an embodiment of the present invention applied for the light measuring system in accordance to which the light reflected from the shutter plane is made use of for the light measurement, the present invention is not always limited to this. Namely, this is also effective for the optical system in accordance to which the light reflected from the film plane or the reflecting means provided near the film plane is made use of for the light measurement and further for the pentagonal prism light measuring system in accordance to which the light scattered from the focusing plate is sensed in the neighborhood of the pentagonal prism.

As explained so far the device for changing over the sensitivity distribution of the light measuring of the camera by changing over the bifocal lens and the diaphragms in accordance with the present invention is simple and compact as compared with the conventional one, while the bifocal lens for this purpose can be made of plastics at low cost, which contributes much to the cutting down the manufacturing cost of the device.

What is claimed is:

1. A light measuring device for a single lens reflex camera comprising:
   a photographic lens;
   a photosensitive means and a shutter plane on the image forming plane of the photographing lens;
   light sensing means for sensing the light from at least one of the photosensitive means and the shutter plane;
   a multi-focal lens between the photosensitive means and the light sensing means;
   said multi-focal lens having a plurality of area zones and having a different focal length for each area zone, and
   selection means for directing the light from each area zone of the multi-focal lens selectively to the light sensing means.

2. A device according to claim 1, wherein the selection means is a diaphragm means arranged near said multi-focal lens and having an adjustable aperture.

3. A light measuring device for a single lens reflex camera comprising:
   a photographic lens defining an image forming plane;
   image receiving means arranged on the image forming plane of the photographic lens;
   light sensing means for sensing light from the image forming plane; and
   filter means including a plurality of filter elements, one of the filter elements being arranged for directing light from a portion of the image to the light sensing means, one of the remaining filter elements directing light from a larger portion of the image to said light sensing means and having a given transmittance distribution or reflective distribution;
   said filter elements having a prescribed transmission rate or reflection rate;
   one of the remaining filter elements being arranged for directing light from a larger portion of the image to said light sensing means and having a transmission rate or reflection rate different from that of said one of the filter elements so as to direct a larger amount of light to said light sensing means per unit area of the light incidence on the filter than said one of the filter elements so that when the same photographic object is photometered, the amount of light incident on said light sensing means is not substantially different between said one of the filter elements and said one of the remaining elements;
   at least either of said one of the filter elements and said one of the remaining filter elements having a number of pinholes for providing said prescribed transmission rate or reflection rate; and
   means for varying the filter elements.

4. A light measuring device for a single lens reflex camera comprising:
   a photographic lens defining an image forming plane;
   image receiving means arranged on the image forming plane of the photographic lens;
   light sensing means for receiving light from the image formed on the image receiving means;
   filter means between said light sensing means and said image receiving means and including a plurality of filter elements selectively movable into and out of the path between said light sensing means and said image receiving means, one of said filter elements being arranged for directing light from a portion of the image to the light sensing means and another of the filter elements directing light from a larger portion of the image to said light sensing means but having a positionally varying light transmittance distribution so as to vary the weighting of light on said sensing means when the other of the elements is in the path of the light from the image receiving means to the light sensing means; and
   means for selecting one of the filter elements for placement in the path between said image receiving means and said light sensing means.

* * * * *